US007574987B2

(12) United States Patent
Preiholt

(10) Patent No.: US 7,574,987 B2
(45) Date of Patent: Aug. 18, 2009

(54) DEVICE FOR HEATING THE COOLANT OF A MOTOR VEHICLE

(75) Inventor: Erik Preiholt, Eskilstuna (SE)

(73) Assignee: Calix AB, Eskilstuna (SE)

(*) Notice: Subject to any disclaimer, the term of this patent is extended or adjusted under 35 U.S.C. 154(b) by 0 days.

(21) Appl. No.: 11/607,918

(22) Filed: Dec. 4, 2006

(65) Prior Publication Data

US 2007/0137599 A1 Jun. 21, 2007

(30) Foreign Application Priority Data

Dec. 2, 2005 (SE) .................................... 0502643

(51) Int. Cl.
*F02N 17/02* (2006.01)
*B60L 1/02* (2006.01)

(52) U.S. Cl. ............................ 123/142.5 E; 123/41.15; 219/205

(58) Field of Classification Search ........... 123/142.5 E, 123/41.15, 198 D; 219/205, 208
See application file for complete search history.

(56) References Cited

U.S. PATENT DOCUMENTS 2,957,069 A * 10/1960 Dammond .................. 219/429
3,626,148 A * 12/1971 Woytowich et al. ... 123/142.5 E
3,943,325 A 3/1976 Pickard
3,969,605 A * 7/1976 Danell .................. 123/142.5 E
4,339,307 A * 7/1982 Ellis, Jr. ..................... 202/206
4,358,665 A * 11/1982 Owen ......................... 392/492
4,634,834 A 1/1987 Lupoli et al.
4,770,134 A * 9/1988 Foreman et al. ....... 123/142.5 R
5,408,960 A * 4/1995 Woytowich ........... 123/142.5 E
2004/0178188 A1* 9/2004 Matsunaga .................. 219/208

FOREIGN PATENT DOCUMENTS

DE 19806902 A1 9/1999
WO WO 01/54459 A1 7/2001
WO WO 2005/108019 A2 11/2005

* cited by examiner

*Primary Examiner*—Noah Kamen
(74) *Attorney, Agent, or Firm*—Venable LLP; Eric J. Franklin

(57) ABSTRACT

A device intended for heating the coolant of a motor driven vehicle in order to heat the engine of the vehicle. The device includes a connection arrangement arranged to allow electrical connection of the device to a current source and a heat-generating element including an electrical conductor designed to generate heat when a current flows through the conductor, which heat-generating element is designed to be in contact with and transfer the generated thermal energy to the coolant water, wherein the electrical conductor is designed in such a way that the conductor is destroyed if the heat transfer from the heat-generating element substantially decreases during a time period, wherein the current through the conductor is interrupted.

13 Claims, 2 Drawing Sheets

DEVICE FOR HEATING THE COOLANT OF A MOTOR VEHICLE

CROSS-REFERENCE TO RELATED APPLICATIONS

This application claims priority under 35 U.S.C. § 119 to Swedish patent application 0502643-0 filed 2 Dec. 2005.

1. Technical Field

The present invention relates to a device intended for heating the coolant in a motor driven vehicle, in order to heat the engine of the vehicle. The device comprises a connection arrangement arranged to allow electrical connection of the device to a current source and a heat-generating element comprising an electrical conductor designed to generate heat when a current flows through the conductor. The heat-generating element is designed to be in contact with and transfer the generated thermal energy to the coolant.

2. Prior Art

Engine heaters comprising a heat-generating element having an electrical conductor, which is heated and transfers thermal energy to the coolant of the vehicle when a current passes through the heat-generating element are known in the art. One problem with such devices is that the device may catch fire or set fire to other components of the vehicle in the event of an error. One example of such an error is if the coolant water does not cover the heat-generating element sufficiently for some reason, for example, due to that some of the coolant has leaked out or that the coolant level has decreased in some other way. This problem has been alleviated in that the electrical conductor has been designed so that the heating power generated in the conductor is sufficient to burn off and destroy the conductor if the heat transfer from the heat-generating element decreases substantially during a time period. The conductor is destroyed in that the conductor becomes heated by the excess heat generated by the conductor, until the conductor melts, wherein the current through the conductor is interrupted.

Another example of an engine heater is a device comprising a heat-generating element in contact with the coolant, and which comprises a thermostat for sensing the temperature of the coolant, and for controlling the current through the device in response to the temperature of the coolant. Hence a control of the engine heater is achieved so that the engine heater does not heat the engine to an unnecessary degree, which saves electric energy. The thermostat is in direct contact with the coolant water so that the thermal energy effectively is conducted to the thermostat.

SUMMARY OF THE INVENTION

One object of the present invention is to provide a device for heating the coolant of a motor driven vehicle, wherein the device has a high level of safety.

This object is achieved with a device that includes a thermostat arranged to interrupt the current through the device when the thermostat senses a temperature exceeding a first limit temperature. Preferably the thermostat is positioned so that it senses the temperature in the surroundings of the heat-generating element and/or the device. Thus the device is designed with an additional safety system, on one hand, the first safety system with the self-destructive electrical conductor, and, on the other hand, the second safety system with the thermostat interrupting the current at high temperatures.

This is advantageous since the self-destructive electrical conductor runs the risk of not being destroyed and interrupting the current when the voltage applied over the heat-generating element is too low. A self-destructive conductor, for example, designed for a normal voltage of 230 V, is normally not destroyed if the voltage decreases below about 180 V, even if the heat transfer has been decreased due to the coolant level dropping. In this case the thermostat interrupts the current, so that the device is turned off in the event of an error, even when there is a possible voltage drop. In turn the thermostat runs the risk of being too slow in the event of an error when there is a normal voltage applied over the heat-generating element, since the thermostat then no longer is in contact with the coolant and thus is not heated as quickly as usual. In this case the self-destructive conductor interrupts the current in case of an error, since the conductor has the ability to react quicker to changes in the heat transfer from the heat-generating element. Thus a device is achieved, which has more than double safety in comparison with the devices according to the prior art.

Preferably, said first limit temperature is in the range between 50-120° C., more preferably between 70-100° C. and most preferably in the range between 80-90° C. Hence the current is interrupted by the thermostat in good time before any component runs the risk of being set on fire, without the thermostat effecting the heating of the coolant water under normal conditions. Alternatively the thermostat may instead also be used for controlling the heating.

According to another embodiment of the invention the thermostat is designed to interrupt the current through the device at least until the temperature sensed by the device decreases below a second limit temperature, which is lower than the first limit temperature. Preferably said second limit temperature is in the range between 30-70° C., more preferably between 30-50° C. Thus it is ensured that the device does not resume the heating directly after the thermostat has interrupted the current. In that the thermostat resumes a non interrupting state only after the thermostat senses a much lower temperature, it takes a longer time before the device resumes the heating, giving an increased time of disconnection of the device from the current source.

According to a preferred embodiment the device comprises a wall portion arranged to be in contact with the thermostat and the heat-generating element such that the wall portion conducts the thermal energy from the heat-generating element to the thermostat. When the heat transfer from the heat-generating element decreases substantially due to an error, for example, due to that the coolant no longer covers the heat-generating element, the temperature of the heat-generating element increases. The wall portion thus conducts thermal energy to the thermostat, which senses a higher temperature and cuts off the current supply. Due to the wall portion, it is ensured that the heat conduction capacity to the thermostat remains the same regardless of the coolant level.

Preferably the wall thickness between the heat-generating element and the thermostat is smaller than 5 mm, more preferably smaller than 3.5 mm and most preferably smaller than 2.5 mm. Thus, the heat does not need to be conducted a long distance through the wall portion, which increases the ability of the thermostat to sense an elevated temperature and also decreases the reaction time of the thermostat, since it takes a shorter time to heat the wall portion.

According to a preferred embodiment the wall portion is made of metal. Metal is a good conductor of heat, which decreases the reaction time of the thermostat, and metal also withstands high temperatures without breaking. Metal is also resistant to catching fire. Preferably the heat-generating element is connected to the wall portion by soldering. Hence a good contact with good heat conduction between the heat-generating element and the wall portion is achieved.

According to a preferred embodiment the device comprises a housing comprising a first and a second chamber, and a wall arranged between the first and the second chamber for separating them from each other, wherein the first chamber is designed to accommodate the heat-generating element and to allow a flow of coolant through the first chamber, and the second chamber is designed to accommodate the connection arrangement. Thus the housing protects the heat-generating element, and the connection arrangement with the thermostat, respectively. Furthermore the housing is arranged to conduct the coolant through the device, wherein the device is positionable outside the engine. Furthermore the housing separates the connection arrangement from the coolant, which both decreases the risk of corrosion and of short circuiting of the connection arrangement. A short circuit could otherwise lead to a current passing through the device. Furthermore the risk that the thermostat interrupts the current by mistake during normal operation, due to the thermostat being too hot, is decreased.

According to a preferred embodiment of the invention the thermostat is a part of the connection arrangement, wherein the thermostat is arranged inside the first chamber, and the wall between the chambers comprises said wall portion. Hence the thermostat is protected from the coolant at the same time as the heat conduction between the heat-generating element and the thermostat is ensured through the wall portion. Preferably the wall is designed so that the wall portion is thinner than the rest of the wall. Hence a good durability of the wall is ensured at the same time, as the heat only needs to be conducted a short distance in order to reach the thermostat.

According to a further embodiment of the invention the device comprises a cast compound of a polymer material arranged to at least partly fill the second chamber. Preferably the polymer material is polyurethane. The polyurethane cast compound functions as an electrical insulator inside the device, and the cast compound also protects the device against condensate water. The electrical conductors may therefore be mounted closer to each other, due to the decreased hazard of short-circuiting, which decreases the size of the device. According to one embodiment the device comprises a housing comprising at least two units arranged to define the second chamber, wherein the cast compound is arranged to hold the two units together.

According to one embodiment of the invention the device comprises a housing comprising at least two units, and a spring arranged to lock the units to each other. Preferably said spring is an annular ring. Hence it is simple and quick to assemble the device. Preferably one of the units comprises a cone shaped surface adapted to be inserted into and press the annular ring open during the assembly of the units to each other. Thus the cone shaped part may simply be inserted into and passed through the annular ring. Preferably, the units are shaped to form a groove in connection with the larger diameter end of the cone shaped surface, wherein the annular spring is adapted to be snapped into the groove so that the spring locks the units to each other. Hence it is very quick to assemble the device by simply pressing the units together. Furthermore the units become permanently attached to each other so that it is no longer possible to open the units after assembly. Preferably the device also comprises a seal arranged between the first and the second units to seal against leakage. Preferably the seal is an O-ring. According to one embodiment the first unit is arranged to define the lower part of the first chamber and the second unit comprises said wall between the chambers.

According to one embodiment of the invention the thermostat is a bimetal thermostat. Such a thermostat is inexpensive and can easily be designed with required temperature sensitivity. Furthermore, the bimetal thermostat may easily be designed with hysteresis so that the bimetal thermostat remains in a current-interrupting state even after that the temperature has decreased below the first limit temperature.

According to one embodiment of the invention the heat-generating element is a burnout element. Such a burnout element is present on the market, inexpensive to produce, and is easy to adapt for the desired voltage, so that the burnout element interrupts the current through the burnout element, in the case when the heat transfer from the burnout element decreases due to that it is only effected by thermal radiation or by heat convection by air.

SHORT DESCRIPTION OF THE DRAWINGS

DETAILED DESCRIPTION

Figure 1:
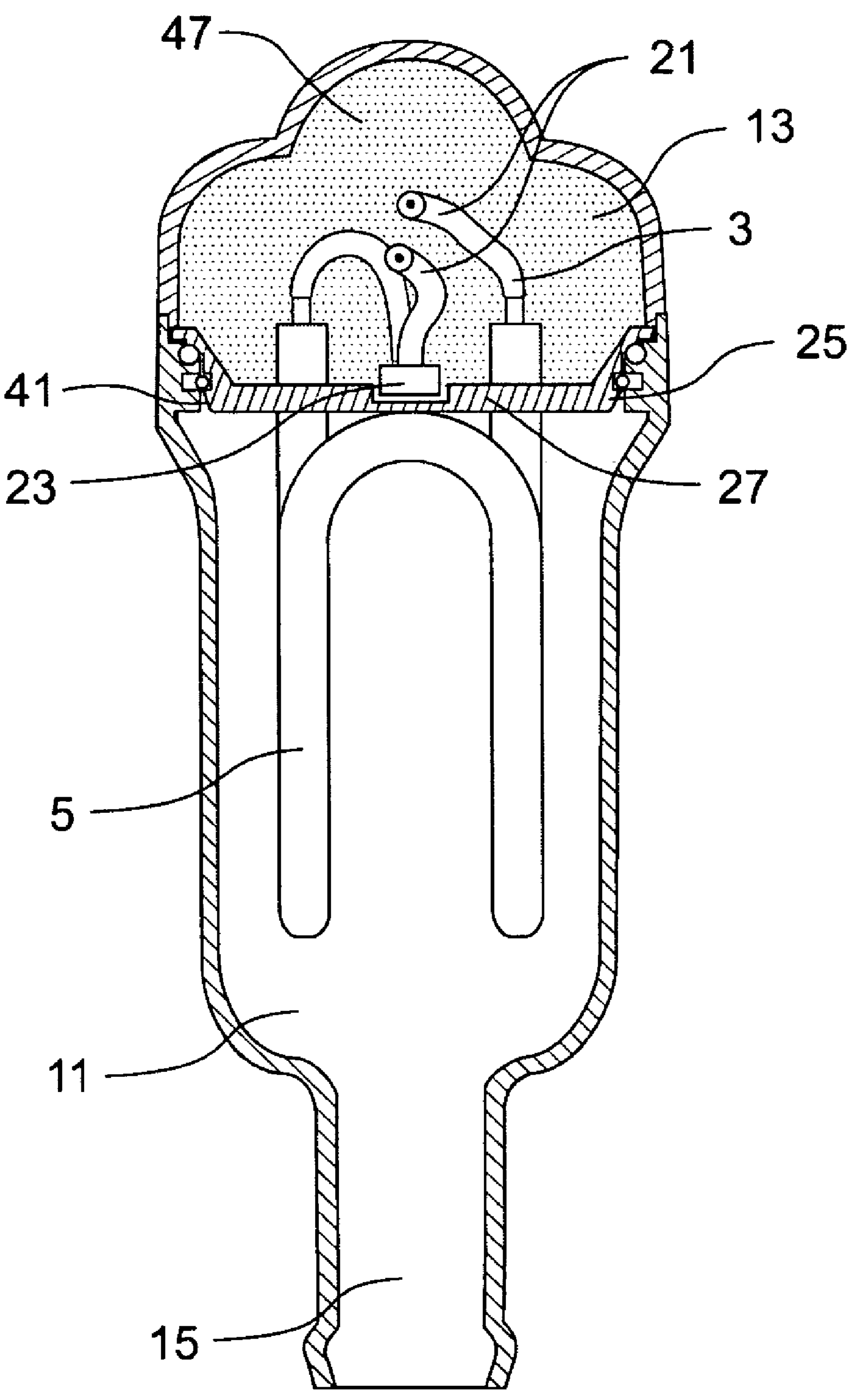
FIG. 1 shows a front view of a device in cross section according to one embodiment of the invention.
Figure 2:
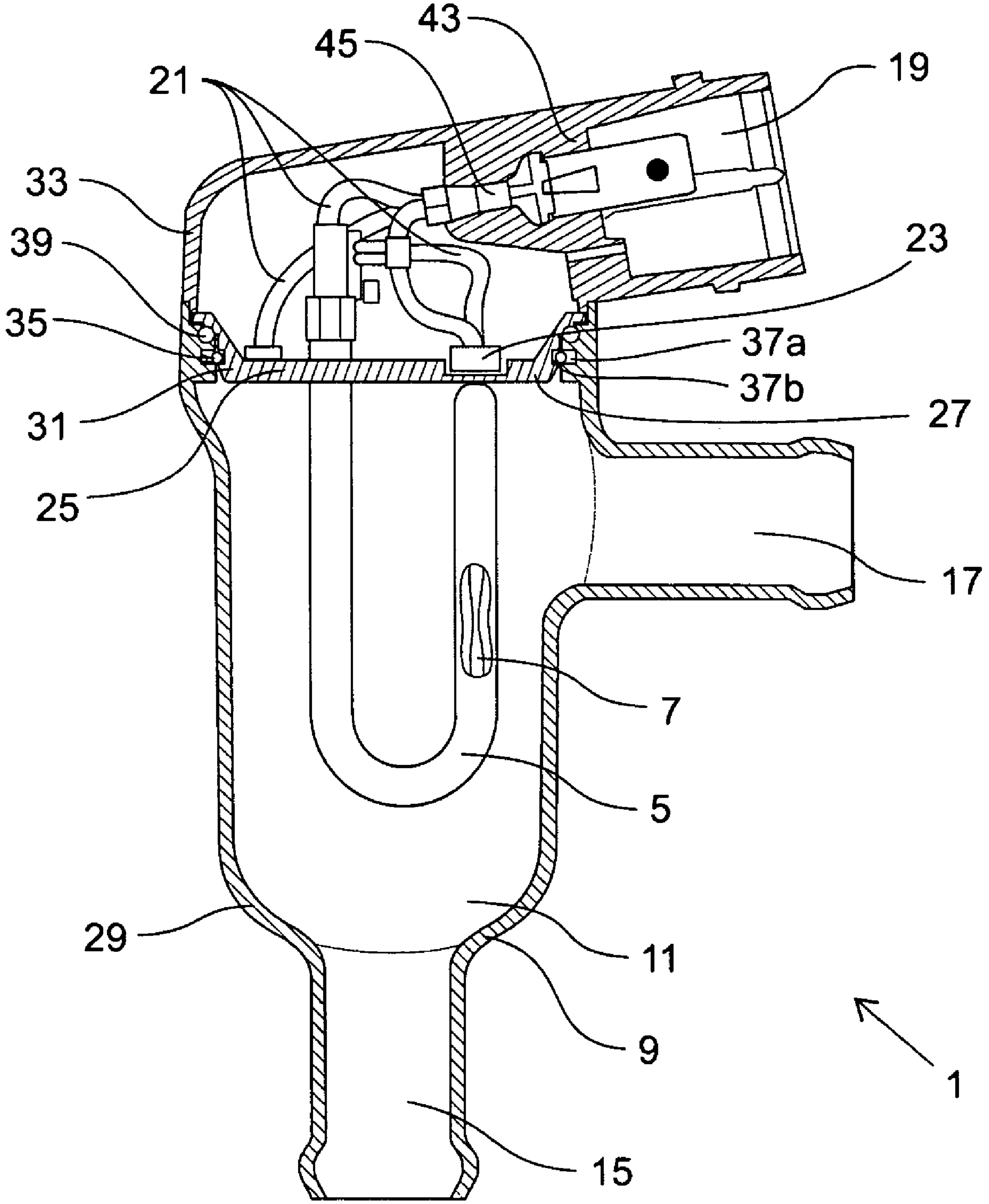
FIG. 2 shows a side view of the device in cross section according to the same embodiment of the invention.

In FIG. 1 and 2 a cross section of a device 1 is shown, which device is intended for heating the coolant of a motor driven vehicle in order to heat the engine of the vehicle. The device 1 comprises a connection arrangement 3 arranged to allow electrical connection of the device 1 to an external current source. The device 1 further comprises a heat-generating element 5, comprising an electrical conductor 7, designed to generate heat when a current flows through the conductor. The device 1 further comprises a housing 9 comprising a first chamber 11 designed to accommodate the heat-generating element 5 and a second chamber 13 arranged to accommodate the connection arrangement 3.

The first chamber 11 is designed with an inlet opening 15 arranged to be connected with a first fluid conductor in order to allow an inflow of coolant water to the first chamber 11, and an outlet opening 17 arranged to be connected with a second fluid conductor in order to allow an outflow of coolant water from the first chamber 11. The first chamber 11 is thus designed to allow a flow of coolant water through the chamber 11. The inlet opening 15 is arranged in the lower part of the first chamber 11 wherein, when the heat-generating element 5 heats the coolant water in the first chamber, the water rises upwards and out through the outlet 17 arranged in the upper part of the chamber 11. Thus there is no need for a pump to circulate the coolant water. Of course, the inlet and the outlet may be interchanged with each other so that the direction of the fluid flow through the device is changed, by simply turning the device upside down or in some other direction.

In turn, the second chamber 13 comprises an opening 19 to allow the passage of three electrical conductors 21, belonging to the connection arrangement 3. The first and the second of these three conductors 21 are arranged to connect the device to an external current source, for example a vehicle battery or household electricity. The third conductor is a grounding conductor to increase the safety in case of an overload.

The electrical conductor 7 in the heat-generating element 5 is in this example designed so that at least one portion of the conductor 7 has a cross sectional area and a conducting material adapted so that the conductor 7 is destroyed if the heat transfer from the heat-generating element 5 decreases substantially for a period of time. The conductor is destroyed due to that the conductor 7 is heated by the generated excess thermal energy so that the conductor eventually is burned off. When the conductor 7 is destroyed the current through the conductor is interrupted, wherein the heat generation terminates. The heat transfer may decrease substantially if, for example, the amount of coolant water in the first chamber 11 for some reason has decreased, since the heat conduction between the water and the heat-generating element is higher than the heat conduction between air and the heat-generating element. Another example is if the circulation of the coolant water for some reason has been blocked, wherein the coolant water no longer has the ability to remove thermal energy transferred to the coolant water. In that the conductor 7 is destroyed, if the coolant water for some reason has leaked out of the coolant system or if the level of the coolant for some other reason is too low the risk that the device 1 will catch fire or set fire to other objects is decreased.

When the voltage over the heat-generating element 5 is low there is a risk that the electrical conductor 7 will not be burned off and destroyed despite a possible substantial decrease of the heat transfer. In this example the connection arrangement 3 therefore comprises a thermostat 23 arranged to interrupt the current through the device 1 when the thermostat 23 senses a temperature exceeding a first limit temperature. In this example the thermostat 23 is arranged to interrupt the current through the device 1 when the temperature has increased over a first limit temperature due to the heat transfer from the heat-generating element for some reason decreasing substantially according to the examples above. The thermostat 23 is hence arranged to interrupt the current in the event of an error occurring at the same time, that the voltage over the heat-generating element 5 is low. The safety of the device 1 therefore increases substantially.

In this example the thermostat 23 is a bimetal thermostat. The thermostat 23 is arranged to interrupt the current when the thermostat 23 senses a temperature exceeding a first limit temperature being in the range between 80-90° C. In another example the thermostat 23 may instead be arranged to interrupt the current when the thermostat 23 senses a temperature exceeding a first limit temperature being in the range between 50-120° C., or more preferably between 70-100° C. Thus the first limit temperature is sufficiently high that the thermostat 23 only interrupts the current in the event of an error, and sufficiently low for the current to be interrupted before anything can be set on fire.

The thermostat 23 is further designed to interrupt the current through the device 1 at least until the temperature has fallen below a second limit temperature, which is lower than the first limit temperature. In this example the second limit temperature is in the range between 30-40° C., but in another example it may be between 30-70° C. Hence the current is interrupted for a longer time after that the thermostat 23 has registered an error, wherein the probability that the error is noticed and can be corrected before the current is reapplied increases.

The housing 9 comprises a wall 25 separating the first 11 and the second chamber 13 from each other. In turn, the wall 25 comprises a wall portion 27 arranged to be in contact with the thermostat 23 and with the heat-generating element 5 so that the wall portion 27 conducts thermal energy from the heat-generating element 5 to the thermostat 23. Hence it is ensured that heat is conducted to the thermostat even if the coolant water level drops.

The wall 25 is designed in such a way that the wall 25 is provided with a notch, inside which the thermostat 23 is attached. The wall portion 27 is thus designed thinner than the rest of the wall 25, which decreases the distance that heat must be conducted from the heat-generating element 5 to the thermostat. In this example the wall 25 and the wall portion 27 are designed so that the wall thickness between the thermostat 23 and the heat-generating element is less than or equal to 2.5 mm. In another example of the invention the wall thickness between the thermostat and the first chamber may instead be less than or equal to 5 mm, or, more preferably, less than or equal to 3.5 mm.

In this example the housing 9 comprises three separate units 29, 31, 33, which are assembled to form said first 11 and second chamber 13. The first unit 29 is arranged to define the lower part of the first chamber 11 and comprises the inlet 15 and the outlet 17 to the first chamber. The second unit 31 of the house comprises said separating wall 25, and is designed to be attached to the upper part of the first unit 29. The second unit 31 is thus arranged to define the ceiling of the first chamber 11. Since the first 29 and the second unit 31 will be in contact with the heated coolant water the first 29 and the second unit 31 are made in a metal. The third unit 33 is arranged to define the walls and ceiling of the second chamber 13, and is, in this example, designed to be attached to the first unit 31. Furthermore the third unit 33 comprises the opening 19 for the conductors 21 of the connection arrangement 3 to the external current unit. The third unit 33 is manufactured in a thermosetting plastic.

The heat-generating element 5 is connected with the second unit 31 in such a way that the heat-generating element, on one hand, passes through two openings through the second unit to allow electrical connection between the heat-generating element 5 and the connection arrangement 3, and, on the other hand, is soldered onto the underside of the wall portion 27 to allow heat transfer to the thermostat 23. The heat-generating element 5 is bent to follow a path in the first chamber 11. The heat-generating element first extends downwards towards the inlet, then turns upwards until the heat-generating element 5 touches the wall portion 27 arranged in the wall 25 of the second unit, then turns downwards towards the inlet again and then once again turns upwards and passes through the wall 25 of the first chamber and to the connection arrangement 3. The heat-generating element 5 is soldered to the wall portion 27 in the point in which the heat-generating element 5 touches the wall portion 27. By bending the heat-generating element 5 a large area between the heat-generating element 5 and the coolant water is obtained, and the distance between the heat-generating element 5 and an arbitrary point inside the first chamber 11 also becomes small, which allows an even and efficient heating of the coolant water.

In this example the housing 9 comprises an annular spring 35 arranged to connect the first 29 and the second unit 31 with each other. The first 29 and the second unit 31 therefore each comprises a groove 37*a*, 37*b* in which the annular spring is arranged. The annular ring 35 thus locks the first 29 and the second unit 31 against displacement of the units away from each other. The housing 9 further comprises a seal 39, in this example in the form of an O-ring, arranged between the first 29 and the second unit 31 for sealing against leakage. In this example the O-ring is arranged inside a space running around and along the interface between the first 29 and the second unit 31.

In this example the second unit 31 comprises a cone shaped and beveled surface 41. During manufacturing of the device 1 the cone shaped part of the second unit 31 is simply pressed into the first unit 29, wherein the annular spring 35 is pressed outwards by the cone shaped surface 41 and is then contracted inside the groove 37*a*, 37*b*. Hence the spring 35 locks the second unit 31 inside the first unit 29.

The second chamber 13 is in this example filled with a cast compound 47, in this example polyurethane plastic, in order to protect the connection arrangement 3. The polyurethane cast compound insulates the connection arrangement so that the risk of electrical short circuit is decreased. The third unit 33 further comprises a protective wall 43 arranged in connection with the opening 19 to block the entering of unwanted objects, such as dust or dirt, or of fluids, such as oil or water, into the second chamber 13. The protective wall 43 is provided with three openings to allow passage of the electrical cables and of the grounding cable. The protective wall 43 is further provided with two further openings 45 shaped to allow insertion of said polyurethane cast compound.

During manufacturing of the device 1 the third unit 33 is attached to the second unit 31 in that the units are pressed together. The units 31, 33 are then held together by friction. Thereafter the protective wall is put onto the three cables and is attached inside the opening 19 and thereafter the second chamber 13 is filled with the polyurethane cast compound through one of the polyurethane openings. During the filling the second chamber 13 is emptied of air through the second of the two polyurethane openings. Thereafter the polyurethane cast compound is cured. The polyurethane cast compound hence joins the second 31 and third units 33 permanently to each other.

The invention can be varied and modified in a large number of ways without departing from the invention. For example the heat-generating element does not need to be a burnout element and the thermostat does not need to be a bimetal thermostat, but they may be other forms of heat-generating elements and thermostats, respectively. The housing can be designed as only one chamber or as more than two chambers. Furthermore the annular ring connecting the first and the second units of the housing to each other may instead connect the first and the third unit, alternatively the second and the third unit, to each other. The units may also be attached to each other in some other way, for example through gluing, screwing, soldering, snapping or riveting. Neither does the device need to comprise any housing at all but may be arranged directly inside the water passages of for example the engine.

Furthermore the device may comprise several heat-generating elements and thermostats respectively. The device may also be a part of a larger engine heater system in which other parts of the vehicle are heated as well. Furthermore the materials mentioned may be substituted for other materials with corresponding function and/or performance. The coolant heated by the device may be used to heat both the engine and/or the driver compartment.

The invention is not limited to the embodiments shown but may be varied within the framework of the attached claims.

The invention claimed is:

1. A device intended for heating the coolant of a motor driven vehicle in order to heat the vehicle before a cold start, the device comprising:

a connection arrangement arranged to allow electrical connection of the device to a current source;

a heat-generating element comprising an electrical conductor designed to generate heat when a current flows through the conductor, which heat-generating element is designed to be in contact with and transfer the generated heat to the coolant; and a thermostat arranged to interrupt the current through the device when the thermostat senses a temperature exceeding a first limit temperature at a voltage below the voltage of the motor vehicle, thereby interrupting the current through the electrical conductor before the electrical conductor is destroyed, wherein the electrical conductor is destroyed at the first temperature limit at the voltage of the motor vehicle if the heat transfer from the heat-generating element is substantially decreased during a period of time, thereby interrupting the current through the electrical conductor before the thermostat interrupts the current through the conductor.

2. The device according to claim 1, further comprising:

a wall portion arranged to be in contact with the thermostat and with the heat-generating element so that the wall portion conducts heat from the heat-generating element to the thermostat.

3. The device according to claim 2, wherein the wall portion is of metal.

4. The device according to claim 2, wherein the heat-generating element is connected with the wall portion by soldering.

5. The device according to claim 1, wherein a thickness of the wall portion between the heat-generating element and the thermostat is less than 5 mm.

6. The device according to claim 1, further comprising:

a housing comprising a first and a second chamber and a wall arranged between the first and the second chamber, wherein the first chamber accommodates the heat-generating element and allows coolant to flow through the first chamber, and the second chamber accommodates the connection arrangement.

7. The device according to claim 6, wherein the thermostat constitutes a part of the connection arrangement and wherein the wall comprises a wall portion in contact with the thermostat and with the heat-generating element such that the wall portion conducts heat from the heat-generating element to the thermostat.

8. The device according to claim 7, wherein the wall portion is thinner than a remaining portion of the wall.

9. The device according to claim 6, further comprising:

a cast compound at least partially filling the second chamber.

10. The device according to claim 1, further comprising:

a housing comprising at least two units in which the connection arrangement, the heat-generating element and the conductor are arranged; and a spring arranged to lock the at least two units together.

11. The device according to claim 10, wherein said spring is an annular spring and wherein one unit of the housing comprises a cone shaped surface designed to be inserted into and open the annular spring during assembly of the at least two units together.

12. The device according to claim 11, wherein the cone shaped surface comprises a groove, wherein the annular spring snaps into the groove to lock the housing units together.

13. The device according to claim 1, wherein the heat generating element is destroyed at a temperature below a temperature at which the device would catch fire.

* * * * *